June 14, 1960
W. D. TEAGUE, JR
2,940,696
DIFFERENTIAL MIXER
Filed April 27, 1955
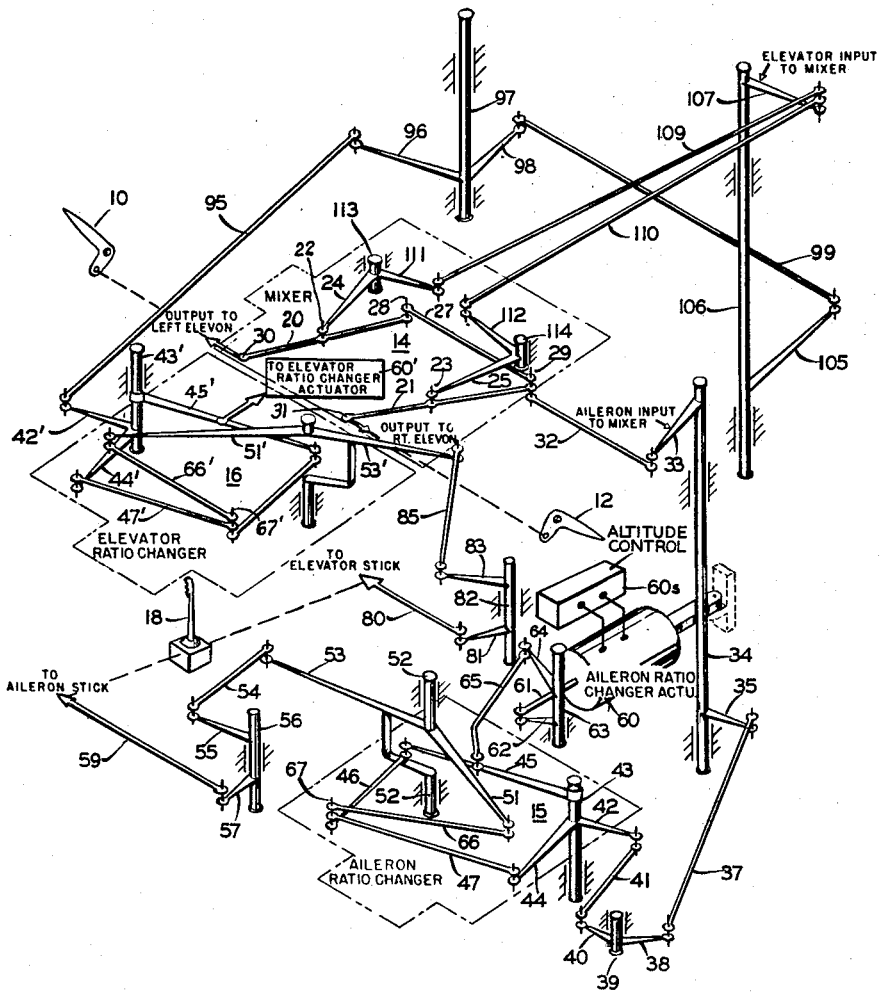
INVENTOR.
WALTER D. TEAGUE JR.
BY
Oscar B Brumback
ATTORNEY United States Patent Office 2,940,696
Patented June 14, 1960

2,940,696

DIFFERENTIAL MIXER

Walter D. Teague, Jr., Alpine, N.J., assignor to Bendix Aviation Corporation, Teterboro, N.J., a corporation of Delaware Filed Apr. 27, 1955, Ser. No. 504,284

6 Claims. (Cl. 244—83)

This invention relates generally to a steering system for aircraft.

Aircraft of the flying wing type have a pair of surfaces, known as elevons, which operate both as elevators and as ailerons. Operating the two surfaces in the same direction controls the pitch attitude of the craft so that the surfaces act as the elevators of conventional aircraft. Operating the surfaces in different directions, on the other hand, controls the roll attitude of the craft so that the surfaces operate as the ailerons of conventional aircraft. Sometimes, to control the aircraft, it is necessary to control the two surfaces so that both surfaces move in the same direction with respect to their normal position to change the pitch attitude and yet, at the same time, move differentially with respect to each other.

In accordance with the present invention, movement of the surfaces may be effected by the operation of a conventional control column, and the ratio of movement of the controller to movement of the surfaces may be individually adjusted for each mode of operation.

An object of the present invention, therefore, is to provide novel means for operating the elevons of a craft selectively in the same and/or different directions.

Another object is to provide a novel means for operating the elevons of an aircraft differential with respect to a reference position and for displacing the reference from a normal datum position.

Still another object is to provide a novel means for changing the ratio of movement of a controller to the resultant movement of the control surface of the craft.

A further object is to provide a novel means for operating the elevons of an aircraft in response to actuation of a manual controller and having the relative movement of the elevons in response to fore and aft and lateral movement of the controller independently adjustable to give various ratios of controller to elevon movement.

The present invention contemplates a novel arrangement for actuating the elevons of an aircraft in the same or different direction by the movement of a controller, a mixer being provided to respond to the movements of the controller to provide simultaneous unidirectional or differential action of the surfaces and a ratio changer for each manner of movement whereby the ratio of controller movement to surface movement may be varied for longitudinal movement at one ratio and fore and aft movement at another ratio.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates a control system for the elevon surfaces of an aircraft in accordance with the present invention.

Turning now to the drawing, the steering system for the left elevon 10 and the right elevon 12 comprises generally a mixer 14, an aileron ratio changer 15, an elevator ratio changer 16, and a manual controller 18. Movement of controller 18 in a lateral direction displaces the elevon surfaces in opposite directions, and movement in a fore and aft direction displaces the surfaces in the same direction.

Mixer 14 receives the aileron and elevator controller actions to produce an output which is a composite of the differential and unidirectional output for the elevons. The mixer comprises a pair of levers 20 and 21 which are pivoted by pins 22 and 23 to supporting arms 24 and 25 and which have their ends connected together by member 27 and pins 28 and 29. The other ends 30 and 31 of these levers are connected by suitable conventional means to the left and right elevon surfaces 10 and 12, respectively.

To obtain a differential action for the elevon surfaces, pin 29 is positioned by a member 32 which is actuated through a series of linkages extending from controller 18. Member 32 is pivotally connected to one arm 33 of a shaft 34 whose other arm 35 is connected by a member 37 to the arm 38 of a second shaft 39 whose arm 40 is connected by a member 41 to arm 42 of another shaft 43 whose arms 44 and 45 constitute a portion of the ratio changer 15. The ratio changer, in turn, is connected to the manual controller 18 through a series of linkages.

Ratio changer 15 for the aileron channel and 16 for the elevator channel may be identical so only ratio changer 15 will be described in detail; the corresponding parts of the other ratio changer 16, however, will be given prime numbers. The purpose of these ratio changers is to change the relative displacement of the control surface for a given displacement of the manual controller so that a given displacement of the controller will effect the same aerodynamic action on the craft despite changes in the parameters of flight and the ratio changers may be of a type described and claimed in copending application Serial No. 504,270, filed April 27, 1955 by Walter D. Teague, Jr., and assigned to Bendix Aviation Corporation.

Ratio changer 15 comprises a polygon which is in the nature of a parallelogram having a pair of equal sides 44 and 46 and a pair of equal sides 45 and 47. The input to the ratio changer is supplied through arm 51 of a shaft 52 whose arm 53 is connected by member 54 to arm 55 of another shaft 56 whose arm 57 is connected by member 59 to the manual controller 18. Thus, the lateral displacement of controller 18 rotates shaft 52 about its axis; and since arm 51 is connected by member 66 to the pivot pin 67 joining arms 46 and 47, pin 67 is also rotated.

The extent of displacement of pivot pin 67 in response to a given angular displacement of shaft 52 depends upon the position of pivot 67 relative to shaft 52. This position is determined by the aileron ratio changer actuator 60 which positions a shaft 61 connected to arm 45 through arm 62 of a shaft 63 whose arm 64 is connected by member 65 to arm 45. Thus, the rotation of shaft 63 by actuator 60 rotates arm 45 about shaft 43 on which the arm 45 is rotatably mounted and positions pin 67 relative to shaft 52, and the more nearly pin 67 approaches shaft 52, the smaller the extent of motion of pin 67 relative to the turning of shaft 52. Conversely, the greater the distance of pin 67 from shaft 52, the greater will be the motion of shaft 52. The actuator 61 for positioning pin 67 is operable in response to a flight parameter of the craft and is illustrated herein as being operable in response to change in altitude of the craft as measured by a conventional altitude control 60s.

Due to the parallelogram-like arrangement, the movement of pin 67 rotates shaft 43 whose arm 42 moves pin 29 through linkage 41, 37, and 32. The movement of pin 29 rotates levers 20 and 21 about pivots 22 and 23. This exerts a "push," for example, on one elevon surface to push it upwardly and a "pull" on the other to pull it downwardly. Thus, these actions, in response to the movements of controller 18 in a lateral direction, displace the elevon surfaces differentially to control the craft about the roll axis.

While the craft is being controlled about the roll axis by the relative displacement of the surfaces, the craft may also be placed in a desired pitch attitude. To this end, the longitudinal movement of the controller 18 by way of a suitable mechanical connection 80 and arm 81 rotates a shaft 82 whose arm 83 through a member 85 supplies the input to the ratio changer 16 which, as discussed above, is identical to the ratio changer 15. The output of the ratio changer 16 is transmitted by way of member 95, arm 96, shaft 97, arm 98, and member 99 to arm 105 of shaft 106. Arm 107 is connected to a pair of members 109 and 110 which angularly displace arms 111 and 112 of shafts 113 and 114 whose arms 24 and 25 support pivot pins 22 and 23. Thus, movement of arm 107 either pulls pins 22 and 23 together or spreads them apart. If, for example, pins 22 and 23 be pulled together elevons 10 and 12 are displaced downwardly; and if the pins be spread apart, the elevons are pushed upwardly. Thus, fore and aft movement of controller 18 displaces surfaces 10 and 12 in the same direction.

From the foregoing it can be seen that the elevons 10 and 13 may be displaced in the same direction and also be displaced differentially at the same time. For example, the elevons may be displaced upwardly by the displacement of stick 18 in a fore and aft direction which spreads pins 22 and 23 apart. At the same time, the stick may be displaced in a lateral direction thereby moving pivot pin 29 and rotating levers 20 and 21 about pins 22 and 23 to differentially displace the elevons.

The foregoing has presented a novel steering system for craft of the type having two control surfaces which are displaced together in the same direction to control the pitch attitude of the craft and displaced differentially to control the roll attitude. The surfaces may be displaced differentially and yet be displaced in relatively the same direction from the normal reference position. The extent of displacement of the surface differentially in response to displacement of the controller may be adjusted to provide one ratio of controller to surface movement, and the extent of displacement of the surfaces in the same direction in response to displacement of the controller may be adjusted independently to give a different ratio of controller to surface movement.

What is claimed:

1. In a control system for an aircraft having a pair of surfaces which are displaceable in the same direction to control the pitch attitude of the craft and in different directions to control the roll attitude of the craft, a controller capable of movement in a fore and aft and in a lateral direction, whereby movement of said controller in said fore and aft direction commands the displacement of said surfaces in the same direction and movement in the lateral direction commands displacement of said surfaces in different directions, a mixer responsive both to said input movement in the lateral direction and to said input movement in the fore and aft direction for developing an output which corresponds to a composite of said unidirectional and differential movements, means interposed between said controller and said mixer for individually adjusting said inputs for each direction of movement including a polygon having two adjacent arms fixed to a shaft and two sides pivoted to said arms and pivoted together at a common pivot with a link connected to said common pivot for receiving said input movement and means for angularly displacing said common pivot relative to said input, whereby the ratio of input from said controller to adjusted input for said mixer is changed, and means responsive to said output for moving said surfaces.

2. A control system for an aircraft having a controller movable in a longitudinal and a lateral direction for operating control surfaces of a craft to maneuver the craft about its respective pitch and roll axes; comprising means operatively connecting said controller to said surfaces to effect movement of said surfaces in one sense upon longitudinal movement of said controller and movement of said surfaces in another sense upon lateral movement of said controller, said connecting means including means for adjusting the ratio of movement of said controller to the resulting movement of said surfaces in said one and said other senses, motor means for actuating said ratio adjusting means, and altitude responsive means to control said motor means in accordance with the prevailing altitude of the craft during flight.

3. A mixer for operating elevon surfaces of an aircraft in response to a main controller member movable in one sense for ordering elevon surface movements for controlling the pitch of the aircraft and movable in another sense for ordering elevon surface movements for controlling the roll attitudes of the aircraft; said mixer comprising a pair of levers, means for pivotally supporting each lever intermediate its ends, a member connecting one elevon to one end of one of said levers, a member connecting the other elevon to the end of the other of said levers, means for connecting the other ends of said levers together, means operatively connecting said controller member to said lever connecting means for moving said lever connecting means relative to said levers in response to roll attitude controlling movements of said controller member, whereby said levers are displaced in the same direction about said pivot means to exert a different action on each of said elevons, other means operatively connecting said controller member to said pivotal supporting means, and said other connecting means operable in one sense for drawing together and in another sense for spreading apart said pivotal supporting means in response to pitch attitude controlling movements of said controller member, whereby said levers exert a unidirectional action on said elevons.

4. A control system for an aircraft having a controller movable in a longitudinal and a lateral direction for operating control surfaces of a craft to maneuver the craft about its respective pitch and roll axes, comprising supporting linkage means movably mounted on said craft, other linkage means pivotally movable on and supported by said supporting linkage means, said other linkage means operatively connected to said surfaces, whereby said surfaces are moved in one sense when said other linkage means is moved relative to said supporting linkage means and said surfaces are moved in another sense when said supporting linkage means is moved relative to said craft, first means for operatively connecting said controller to said supporting linkage means and second means for operatively connecting said controller to said other linkage means, and said controller being movable in one sense to effect through said first connecting means movement of said control surfaces in said other sense and said controller movable in another sense to effect through said second connecting means movement of said control surfaces in said one sense to control said craft about its respective pitch and roll axes.

5. The combination defined by claim 4 in which said first and second connecting means include means for individually adjusting the ratio of the movement of said controller to the resulting movement of said surfaces in said one and said other senses.

6. The combination defined by claim 4 in which said first and second connecting means include means for individually adjusting the ratio of the movement of said controller to the resulting movement of said surfaces in said one and said other senses, and altitude responsive means for operating at least one of said ratio adjusting means upon changes in the prevailing altitude of the aircraft during flight.

References Cited in the file of this patent

UNITED STATES PATENTS

| | | |
|---|---|---|
| 1,127,160 | Baker | Feb. 2, 1915 |
| 2,082,172 | Mignet | June 1, 1937 |
| 2,205,610 | Van Nes | June 25, 1940 |
| 2,338,379 | Henke | Jan. 4, 1944 |
| 2,454,981 | Vint | Nov. 30, 1948 |
| 2,522,159 | Billington | Sept. 12, 1950 |
| 2,573,044 | Morris | Oct. 30, 1951 |
| 2,660,383 | Feeney et al. | Nov. 24, 1953 |
| 2,680,581 | McKellar | June 8, 1954 |
| 2,712,420 | Amster et al. | July 5, 1955 |